United States Patent [19]

Oltman

[11] Patent Number: 5,804,327
[45] Date of Patent: *Sep. 8, 1998

[54] THIN WALLED ELECTROCHEMICAL CELL

[75] Inventor: John Edward Oltman, Mount Horeb, Wis.

[73] Assignee: Rayovac Corporation, Madison, Wis.

[ * ] Notice: The term of this patent shall not extend beyond the expiration date of Pat. No. 5,591,541.

[21] Appl. No.: 726,808

[22] Filed: Oct. 7, 1996

Related U.S. Application Data

[63] Continuation-in-part of Ser. No. 435,185, May 5, 1995, Pat. No. 5,591,541.

[51] Int. Cl.$^6$ .............................. H01M 4/00; H01M 6/12; H01M 2/02; H01M 4/32
[52] U.S. Cl. .......................... 429/27; 429/162; 429/171; 429/206; 429/223
[58] Field of Search .................................. 429/166–167, 429/162–165, 168, 170, 171, 27, 206, 223

[56] References Cited

U.S. PATENT DOCUMENTS

| | | | |
|---|---|---|---|
| Re. 31,413 | 10/1983 | Jaggard | 429/27 |
| 3,372,060 | 3/1968 | Platner | 136/86 |
| 3,746,580 | 7/1973 | Aker et al. | 136/86 |
| 3,897,265 | 7/1975 | Jaggard | 136/86 |
| 3,977,901 | 8/1976 | Buzzelli | 136/86 |
| 4,041,211 | 8/1977 | Wiacek | 429/36 |
| 4,054,726 | 10/1977 | Sauer et al. | 429/66 |
| 4,137,375 | 1/1979 | Coueille | 429/66 |
| 4,139,683 | 2/1979 | Sauer et al. | 429/219 |
| 4,166,157 | 8/1979 | McCormick | 429/174 |
| 4,189,526 | 2/1980 | Cretzmeyer et al. | 429/13 |
| 4,209,574 | 6/1980 | Reutschi | 429/133 |

(List continued on next page.)

FOREIGN PATENT DOCUMENTS

| | | | |
|---|---|---|---|
| 26799/77 | 1/1979 | Australia | H01M 4/00 |
| 46311/79 | 8/1979 | Australia | H01M 12/06 |
| 3847978 | 2/1980 | Australia | H01M 2/14 |
| 3336793 | 7/1993 | Australia | H01M 12/06 |
| 943185 | 3/1974 | Canada | 319/112 |
| 982653 | 1/1976 | Canada | 319/106 |
| 1185318 | 4/1985 | Canada | H01M 6/02 |
| 2009465 | 9/1990 | Canada | H01M 2/14 |
| 2125954 | 6/1993 | Canada | H01M 2/02 |
| 2100391 | 1/1995 | Canada | H01M 2/02 |

(List continued on next page.)

OTHER PUBLICATIONS

Japan Acoustics Society Magazine vol. 45 #7 (No Date).
Power Sources 6—Research and Development in Non–Mechanical Electrical Power Sources, Academic Press, Chapter 19, pp. 269–290, Sep. 1, 1976.
Power Sources Symposium Jun. 12, 1978.
Mechanisms of Operation May 1979, Gibbard, Cretzmeyer—Abstract of the zinc–air battery.
Technology Assessment Oct. 1981, Zinc–air Button Cells, Cretzmeyer.
Hitachi Product Literature 1982 Tri–clad metal for button–type batteries, (No Month).

(List continued on next page.)

*Primary Examiner*—Donald R. Valentine
*Attorney, Agent, or Firm*—Thomas D. Wilhelm

[57] ABSTRACT

This invention pertains to alkaline electrochemical cells, typically to metal-air cells of the button-type. Non-reactive elements of cells of the invention are thinner than corresponding non-reactive elements of prior art cells. Such elements can be made thinner because of improved structures of such elements. The anode can is made from a metal strip structure having a higher steel content. The cathode can has a modified temper, which improves relative stiffness and rigidity while retaining sufficient ductility. By so reducing the thicknesses of non-reactive elements of the cell, and thus the volume occupied by such non-reactive elements, the fraction of the cell devoted to holding electrochemically reactive anode material therein is increased, with corresponding increase in the milliampere hour capacity of the cell.

18 Claims, 6 Drawing Sheets

U.S. PATENT DOCUMENTS

| | | | |
|---|---|---|---|
| 4,262,062 | 4/1981 | Zatsky | 429/27 |
| 4,315,062 | 2/1982 | Clarizio | 429/246 |
| 4,343,869 | 8/1982 | Oltman et al. | 429/27 |
| 4,369,568 | 1/1983 | Dopp | 29/623.2 |
| 4,404,266 | 9/1983 | Smilanich | 429/27 |
| 4,419,420 | 12/1983 | Ishizaki | 429/185 |
| 4,457,990 | 7/1984 | Tucholski | 429/162 |
| 4,507,370 | 3/1985 | Urry | 429/142 |
| 4,557,983 | 12/1985 | Sauer | 429/27 |
| 4,591,539 | 5/1986 | Oltman et al. | 429/27 |
| 4,640,874 | 2/1987 | Kelm | 429/27 |
| 4,649,090 | 3/1987 | Oltman et al. | 429/29 |
| 4,656,104 | 4/1987 | Tucholski | 429/185 |
| 4,687,714 | 8/1987 | Oltman et al. | 429/27 |
| 4,791,034 | 12/1988 | Dopp | 429/27 |
| 4,822,698 | 4/1989 | Jackovitz et al. | 429/27 |
| 4,828,939 | 5/1989 | Turley et al. | 429/38 |
| 4,894,295 | 1/1990 | Cheiky | 429/77 |
| 4,957,826 | 9/1990 | Cheiky | 429/27 |
| 5,069,986 | 12/1991 | Dworkin et al. | 429/27 |
| 5,069,989 | 12/1991 | Uetani et al. | 429/164 |
| 5,279,905 | 1/1994 | Mansfield, Jr. et al. | 429/27 |
| 5,308,711 | 5/1994 | Passaniti et al. | 429/29 |
| 5,328,777 | 7/1994 | Bentz et al. | 429/27 |
| 5,415,949 | 5/1995 | Stone et al. | 429/63 |
| 5,432,027 | 7/1995 | Tuttle et al. | 429/127 |
| 5,486,431 | 1/1996 | Tuttle et al. | 429/66 |
| 5,494,495 | 2/1996 | Tuttle | 29/623.2 |
| 5,536,596 | 7/1996 | Lake | 429/162 |
| 5,547,781 | 8/1996 | Blonsky et al. | 429/174 |
| 5,580,674 | 12/1996 | Tuttle et al. | 429/66 |
| 5,582,933 | 12/1996 | Daio et al. | 429/163 X |
| 5,584,891 | 12/1996 | Tuttle | 29/623.1 |
| 5,591,541 | 1/1997 | Oltman | 429/171 |
| 5,603,157 | 2/1997 | Lake et al. | 29/623.4 |
| 5,629,108 | 5/1997 | Lake | 429/174 |

FOREIGN PATENT DOCUMENTS

| | | | |
|---|---|---|---|
| 2105911 | 3/1995 | Canada | H01M 2/02 |
| 2177393 | 4/1995 | Canada | H01M 2/04 |
| 007091 | 1/1980 | European Pat. Off. | H01M 2/04 |
| 094272 | 11/1983 | European Pat. Off. | H01M 2/04 |
| 129881 | 6/1984 | European Pat. Off. | H01M 12/06 |
| 560579A1 | 9/1993 | European Pat. Off. | |
| 629009 | 1/1994 | European Pat. Off. | H01M 2/02 |
| 3034600A | 9/1982 | Germany | |
| 3413257C | 10/1986 | Germany | |
| 55080265 | 12/1978 | Japan | H01M 2/08 |
| 55-12672 | 1/1980 | Japan | H01M 12/06 |
| 55-025916 | 2/1980 | Japan | H01M 4/96 |
| 56-167265 | 12/1981 | Japan | H01M 2/04 |
| 59014251 | 7/1982 | Japan | H01M 2/02 |
| 58-128678 | 8/1983 | Japan | H01M 12/06 |
| 59-054170 | 3/1984 | Japan | |
| 60-41752 | 3/1985 | Japan | H01M 2/02 |
| 60-101858 | 6/1985 | Japan | H01M 2/02 |
| 62012060 | 7/1985 | Japan | H01M 2/02 |
| 665027 | 7/1985 | Japan | H01M 2/02 |
| 60-151957 | 8/1985 | Japan | H01M 2/04 |
| 61-22563 | 1/1986 | Japan | H01M 2/02 |
| 61-22564 | 1/1986 | Japan | H01M 2/04 |
| 61-2279 | 1/1986 | Japan | H01M 12/06 |
| 61-29061 | 2/1986 | Japan | H01M 2/02 |
| 61-515750 | 3/1986 | Japan | H01M 2/02 |
| 61-64063 | 4/1986 | Japan | H01M 2/04 |
| 6362170 | 9/1986 | Japan | H01M 12/06 |
| 63-86248 | 4/1988 | Japan | H01M 2/02 |
| 63-294672 | 12/1988 | Japan | H01M 12/06 |
| 6459757 | 3/1989 | Japan | H01M 2/02 |
| 1151150 | 6/1989 | Japan | H01M 2/02 |
| 1154454 | 6/1989 | Japan | H01M 2/04 |
| 2174051 | 7/1990 | Japan | H01M 2/02 |
| 3297074 | 12/1991 | Japan | H01M 12/06 |
| 4206443 | 7/1992 | Japan | H01M 2/02 |
| 4269446 | 9/1992 | Japan | H01M 2/02 |
| 529025 | 2/1993 | Japan | H01M 12/06 |
| 574423 | 3/1993 | Japan | H01M 2/02 |
| 5258782 | 10/1993 | Japan | H01M 12/06 |
| 8173775 | 7/1996 | Japan | H01M 12/06 |
| 8190901 | 7/1996 | Japan | H01M 2/04 |
| 2236949 | 9/1996 | Japan | H01M 2/02 |
| 2010002 | 11/1978 | United Kingdom | H01M 2/18 |
| 2060985 | 9/1980 | United Kingdom | H01M 2/02 |
| 2110464 | 11/1981 | United Kingdom | H01M 6/12 |
| 2109622 | 10/1982 | United Kingdom | H01M 6/04 |
| WO9401898 | 1/1994 | WIPO | H01M 12/06 |
| WO9600986 | 1/1996 | WIPO | H01M 4/02 |
| WO9617390 | 6/1996 | WIPO | H01M 2/04 |

OTHER PUBLICATIONS

Electronics and Power vol. 29 Jul. 1, 1983 pp. 577–580.

Hearing Journal Apr. 1, 1986 Front Page, Activair advertisement.

Hearng Instruments May 1, 1986 p. 5, Activair advertisement.

National Technical Report, vol. 32, Oct. 1986, pp. 590–596, Translated, Zinc–Air Batteries (Button Type) for Hearing Aids.

Hearing Instruments Jul. 1, 1987 p. 11, Mary Schroeder —Zinc–Air Batteries, Here Today, Here Tomorrow.

Batteries for Present and Future Hearing Aids, Jun. 1, 1990, ASHA, Robert Dopp, pp. 52–54.

National Technical Report vol. 37, Feb. 1, 1991, pp. 38–43, translation.

Hearing Journal Sep. 1, 1991, p. 1, Activair advertisement.

Hearing Journal Nov. 1, 1991, pp. 41–42, Robert Martin—Some Facts You Should Know About Hearing Aid Bateries.

Hearing Journal Jan. 1, 1992 pp. 21–22, Robert Martin—How Long Should a Battery Last?.

1992 IEEE Jun. 1992 35th Int'l Power Sources Symposium. Rasmussen et al—Molybdenum Container Development for Na/S Cells.

Hearing Journal Dec. 1, 1992 3 pages of advertising for Panasonic hearing aid batteries.

Hearing Journal Jul. 1993 p. 39 Announcement of Panasonic Hearing Aid Battery Product Launch.

Hearing Instruments Sep. 1, 1993 Tech Report p. 24, Battery design reflects smaller sizes, greater powers of today's hearing aids.

Hearing Journal Oct. 1, 1993 pp. 45–47, 54–55, Various Product Announcements, Statements—Hearing Aid Batteries.

National Technical Report vol. 40 Aug. 1, 1994 pp. 18–23, Translation–High Capacity Zinc–Air Battery Series for Hearing Aids.

Hearing Journal Sep. 1994 p. 5 Activair advertisement.

Hearing Journal Dec. 1, 1994 p. 5 Panasonic advertisement.

Handbook of Batteries, McGraw–Hill,1995, Ch13 pp. 13.1–13.5, Zinc–Air Cells.

IEEE 97TH8226, Jan. 17, 1997, Twelfth Annual Battery Conference, Dennis Sieminski—Recent Advances in Rechargeable Zinc–Air Battery Technology.

THIN WALLED ELECTROCHEMICAL CELL

CROSS REFERENCE TO RELATED APPLICATIONS

This application is a Continuation-in-Part of application Ser. No. 08/435,185, filed May 5, 1995, now U.S. Pat. No. 5,591,541, herein incorporated by reference in its entirety.

STATEMENT REGARDING FEDERALLY SPONSORED RESEARCH OR DEVELOPMENT

Not Applicable

FIELD OF THE INVENTION

This invention relates to alkaline electrochemical cells. Typically, such cells have metal-containing anode materials, and air cathodes, and are commonly known as metal-air cells. More particularly, this invention relates to the composition and structure of the several components from which the cell is assembled, and to the overall structure of the cell itself, and generally addresses the efficient use of the three-dimensional volume available for use by such cells in electrical appliances. The invention addresses efficient use of non-reactive e.g. structural materials in preserving as much space as possible for occupation by the electrochemically reactive anode material used by the cell for generating electrical energy. Such efficient use provides an increase in the fraction of the overall volume of the cell which can be allocated to/occupied by the electrochemically reactive anode material.

BACKGROUND OF THE INVENTION

The growth in use of small electrically-powered devices has increased the demand for very small metal-air electrochemical cells. Metal-air cells have gained significant popularity because only the anode reaction material need be packaged in the cell. In combination, the cathode reaction material is oxygen, which is drawn from the surrounding environment.

Such small cells are usually disc-like or pellet-like in appearance, and are about the size of garment buttons. These cells generally have diameters ranging from less than 6.4 millimeters to about 25 millimeters, and heights ranging from less than 3.8 millimeters up to about 15 millimeters. The small size and the limited amount of electrochemically reactive material which can be contained in such small metal-air cells result in a need for improving the efficiency and completeness of the electrochemical reactions, which are used in such cells for generating electrical energy.

Such metal-air cells take in atmospheric oxygen, and convert the oxygen to hydroxyl ions in the air cathode by interaction with aqueous alkaline electrolyte. The hydroxyl ions then migrate to the anode, where they cause the metal contained in the anode to oxidize. Usually the active anode material in such cells comprises zinc.

More particularly, the desired reaction in the air cathode of a metal-air cell involves the reduction of oxygen, the consumption of electrons, and the production of hydroxyl ions. The hydroxyl ions are able to migrate through the aqueous alkaline electrolyte toward the anode, where oxidation may occur, forming zinc oxide.

In most metal-air cells, air enters the cell through a port in the bottom of the cathode can. The port extends through the bottom of the cathode can, and may be immediately adjacent the cathode assembly, or may be separated from the cathode assembly by an air reservoir or an air diffusion member.

In any of such arrangements, the port facilitates the movement of air through the bottom of the cathode can and to the cathode assembly. At the cathode assembly, the oxygen in the air reacts with water as a chemically reactive participant in the electrochemical reaction of the cell, and thereby forms the hydroxyl ions.

Since the overall electrochemical capacity of any electrochemical cell is to some extent determined by the quantity of electrochemically reactive materials which can be loaded into the cell, it is important to maximize, in the cell, the size of the cavity which is devoted to containing the electrochemically reactive materials. In the case of a metal-air cell, contained reactive material is limited to the anode material. The improvements recited herein could, however, be applied to a variety of other electrochemical cells, and need not be, indeed are not, limited to metal-air cells.

In general, the size of any given cell is limited by the inside dimensions of the space provided in the article, namely the appliance, in which the cell will operate. For example, the size of a hearing aid cell is limited to the internal dimensions of the space, provided for the cell, in the hearing aid appliance. The internal dimensions of the space are determined by the hearing aid manufacturer, not the power cell manufacturer.

Thus, any given appliance includes a limited amount of gross space/volume allotted to occupancy by the electrochemical cell which powers the appliance. That gross space may ultimately be divided according to four functions, all competing for portions of the gross space. A first and minimal portion of the space is used to provide clearance between the interior elements of the space and the exterior elements of the electrochemical cell.

A second portion of the space is occupied by the structural and otherwise non-reactive elements of the electrochemical cell.

The third portion of the space is allocated for occupation by the electrochemically reactive material in the electrochemical cell, and, in a metal-air cell, especially the anode material.

Finally, a fourth portion of the space, if used, can sometimes be described as "wasted" space, because it serves none of the above first through third functions. Such "wasted" space is typically found outside the cell, e.g. at corner locations, where the corner of the cell is less "square" than is structurally feasible, thereby wasting volume that potentially might be occupied, either directly or indirectly, by electrochemically reactive material. Such "wasted" space might also be considered to be included in the space allocated to "clearance" because such space is typically located outside the cell.

Any increase in the third portion of the space, namely the cavity in the anode can which cavity is allocated to the anode material, is necessarily gained at the expense of one or more of the other three portions of the fixed volume allocated for occupation by the cell, namely the first clearance portion, the second portion devoted to the non-reactive elements of the cell, or any fourth waste portion. Thus, it is important to identify the first, second, and fourth portions of the overall space, and, where possible, to reduce the absolute amount of the space devoted to such uses. To the extent such uses can be reduced, the space so recovered can, in general, be allocated for use to hold additional amounts of electrochemically reactive anode material, thereby increasing the potential overall capacity of the cell to generate electrical energy within the limited amount of gross space/volume provided, in the appliance, for occupation by the cell.

Of the first, second, and fourth portions of the cell, the first portion, devoted to clearance, appears to hold the least potential for providing much if any significant opportunities for reduction in volume, and the total volume of the "clearance" space is typically relatively small. Namely, overall cell height and width dimensions are specified by the International Electrochemical Commission (IEC). While some manufacturers may employ designs which utilize readily definable wasted space on the outside of the cell, especially at lower corners of the cell, other manufacturers appear to more fully utilize the allocated space.

Accordingly, while some small amount of volume may be recovered from "wasted" space, such as by reducing the "clearance" space, applicant has concluded that the greatest potential for recovering space for use in holding anode material, and thus to increase "volume efficiency" of the cell, lies in the second portion of the cell, namely the structural and otherwise non-reactive elements of the cell. These elements generally comprise the cathode can, the anode can, the seal, and the cathode assembly, these typically being all of the major structural elements of the cell except for the reactive anode material. Thus, to get more space for holding the reactive anode material, that space must generally be taken away from the anode can, the cathode can, the cathode assembly, or the seal, or some combination of these.

It is an object of this invention to provide electrochemical cells having increased fractions of the cell-receiving space devoted to containing electrochemically reactive anode material.

It is another object to provide metal-air electrochemical cells wherein the thicknesses of one or more of the anode can, the cathode can, the cathode assembly, or the seal have been reduced to thicknesses never before achieved for an electrochemical cell.

It is still another object of the invention to provide such cells wherein the structural integrity of the cell, to abuse from forces outside the cell, is maintained.

Yet another object is to provide improved anode cans, especially with reduced wall thicknesses.

Still another object is to provide improved cathode cans, especially with reduced wall thickness.

SUMMARY OF THE DISCLOSURE

Some of the objects are obtained in an electrochemical cell. The cell comprises an anode, including an anode can and a cavity in the anode can, and anode material in the cavity, including electrochemically reactive anode material; a cathode, including a cathode can, and a cathode assembly in the cathode can; and a seal between the anode can and the cathode can. The anode and cathode are joined together, with the seal therebetween and, in combination, define a top and a bottom of the cell and a height therebetween. Side walls define a diameter of the electrochemical cell. The height and the diameter, in combination, define an overall volume of the cell. The cavity in the anode comprises a measurable fraction of the overall volume. In cells of the invention, the fraction is preferably at least as great as the value represented by the expression $0.65 + [\text{Log}_{10}(\text{Overall Volume})] * 0.20$. A variety of other expressions represent varying levels of development of the invention. Thus, the fraction may be at least as great as the value represented by the expression $0.69 + [\text{Log}_{10}(\text{Overall Volume})] * 0.22$.

In preferred embodiments, the fraction is represented by a range, the lower end of the range being represented by the expression $0.65 + [\text{Log}_{10}(\text{Overall Volume})] * 0.20$, and the approximate upper end of the range being represented by the expression $0.77 + [\text{Log}_{10}(\text{Overall Volume})] * 0.20$.

In a more preferred range, the value is represented by the expression $0.65 + [\text{Log}_{10}(\text{Overall Volume})] * 0.20$, up to the value represented by the expression $0.80 + [\text{Log}_{10}(\text{Overall Volume})] * 0.281$, more preferably the value being represented by the expression $0.65 + [\text{Log}_{10}(\text{Overall Volume})] * 0.20$, up to the value represented by the expression $0.77 + [\text{Log}_{10}(\text{Overall Volume})] * 0.28$, and still more preferably the value being represented by the expression $0.69 + [\text{Log}_{10}(\text{Overall Volume})] * 0.22$, up to the value represented by the expression $0.77 + [\text{Log}_{10}(\text{Overall Volume})] * 0.20$.

The value of the fraction is well represented by the expression $0.69 + [\text{Log}_{10}(\text{Overall Volume})] * 0.22$.

Other objects of the invention are achieved in a novel anode can for use in an electrochemical cell. The novel anode can has an outer surface to be disposed outwardly in an electrochemical cell when the anode can is assembled thereinto, and an inner surface to be disposed inwardly in the electrochemical cell. The novel anode can comprises a structure having a first outer layer corresponding with the outer surface, a second inner layer corresponding with the inner surface, and a third core layer disposed between the first and second layers.

The first outer layer preferably comprises nickel. The second outer layer preferably comprises copper. The third core layer preferably comprises stainless steel.

The third layer comprises about 77 percent by volume to about 91 percent by volume, preferably about 80 percent by volume to about 91 percent by volume, more preferably about 83 percent by volume to about 91 percent by volume, still more preferably about 87 percent by volume to about 91 percent by volume, most preferably about 91 percent by volume, of the anode can.

The first and second layers, in combination, comprise about 9 percent by volume to about 23 percent by volume, preferably about 9 percent by volume to about 20 percent by volume, more preferably about 9 percent by volume to about 17 percent by volume, still more preferably about 9 percent by volume to about 13 percent by volume, most preferably about 9 percent by volume, of the anode can.

In some embodiments, it is preferred that the first layer comprise about 2 percent by volume to about 7 percent by volume of the anode can, and that the second layer comprise about 7 percent by volume to about 16 percent by volume of the anode can.

In other embodiments, it is preferred that the first layer comprise about 2 percent by volume to about 7 percent by volume of the anode can, and that the second layer comprise about 7 percent by volume to about 15 percent by volume of the anode can.

In yet other embodiments, it is preferred that the first layer comprise about 2 percent by volume to about 6 percent by volume of the anode can, and that the second layer comprise about 7 percent by volume to about 11 percent by volume of the anode can.

In highly preferred embodiments, the first layer comprises about 2 percent by volume of the anode can, and the second layer comprises about 7 percent by volume of the anode can.

The thickness of the novel anode cans of the invention, between the inner and outer surfaces, is between about 0.075 millimeter and about 0.145 millimeter, preferably between about 0.075 millimeter and about 0.127 millimeter, more preferably from about 0.090 millimeter to less than about 0.110 millimeter.

This invention comprehends an electrochemical cell made with an anode can of the invention. The cell includes a cathode can joined with the anode can, and a seal between the anode can and the cathode can.

Still other objects are achieved in a cathode can for use in an electrochemical cell. The cathode can has an inner surface to be disposed inwardly in an electrochemical cell when the cathode can is assembled thereinto, and an outer surface to be disposed outwardly in an electrochemical cell when the cathode can is assembled thereinto. The cathode can comprises a three-layer structure having a first core layer of cold rolled steel, plated or otherwise covered on opposing surfaces thereof with second and third layers of nickel. The cathode can has a thickness between the inner and outer surfaces of between about 0.075 millimeter and about 0.155 millimeter, preferably between about 0.075 millimeter and about 0.140 millimeter, more preferably from about 0.090 millimeter and up to less than about 0.110 millimeter, and most preferably from about 0.100 millimeter up to less than about 0.110 millimeter.

Preferably, the second and third layers are about 0.00165 millimeter (0.000065 inch) to about 0.00215 millimeter (0.000085 inch) thick, the second and third layers corresponding with the inner and outer surfaces of the cathode can.

The second and third layers are preferably diffusion bonded to the core layer. The three-layer structure is annealed after diffusion bonding, and temper rolled after annealing, such that the three-layer structure is both work hardened, and tempered to about Temper 3.5.

DETAILED DESCRIPTION OF THE ILLUSTRATED EMBODIMENTS

Figure 1:
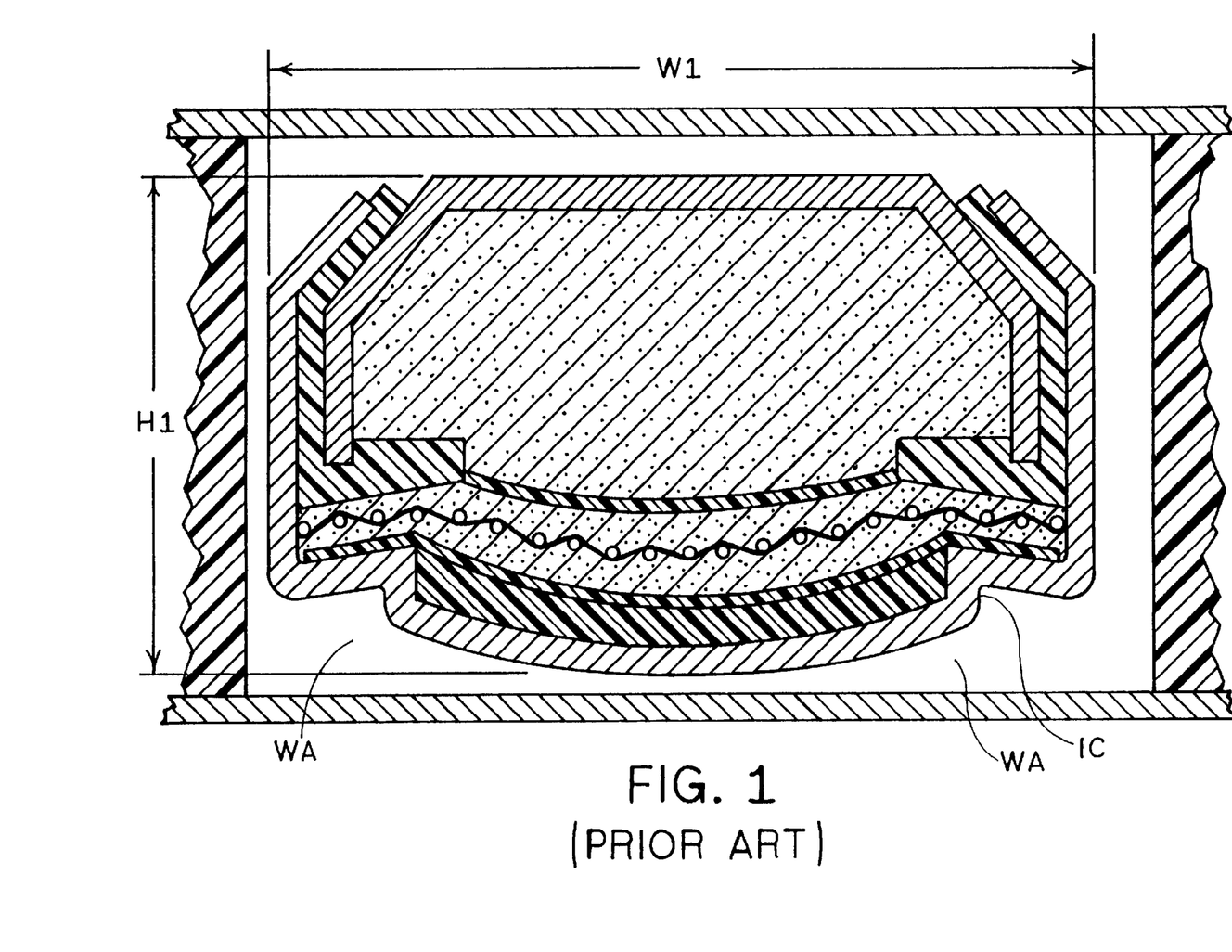
FIG. 1 shows a cross-section of a prior art metal-air electrochemical cell in an appliance, inside the space allocated for the cell.
Figure 2:
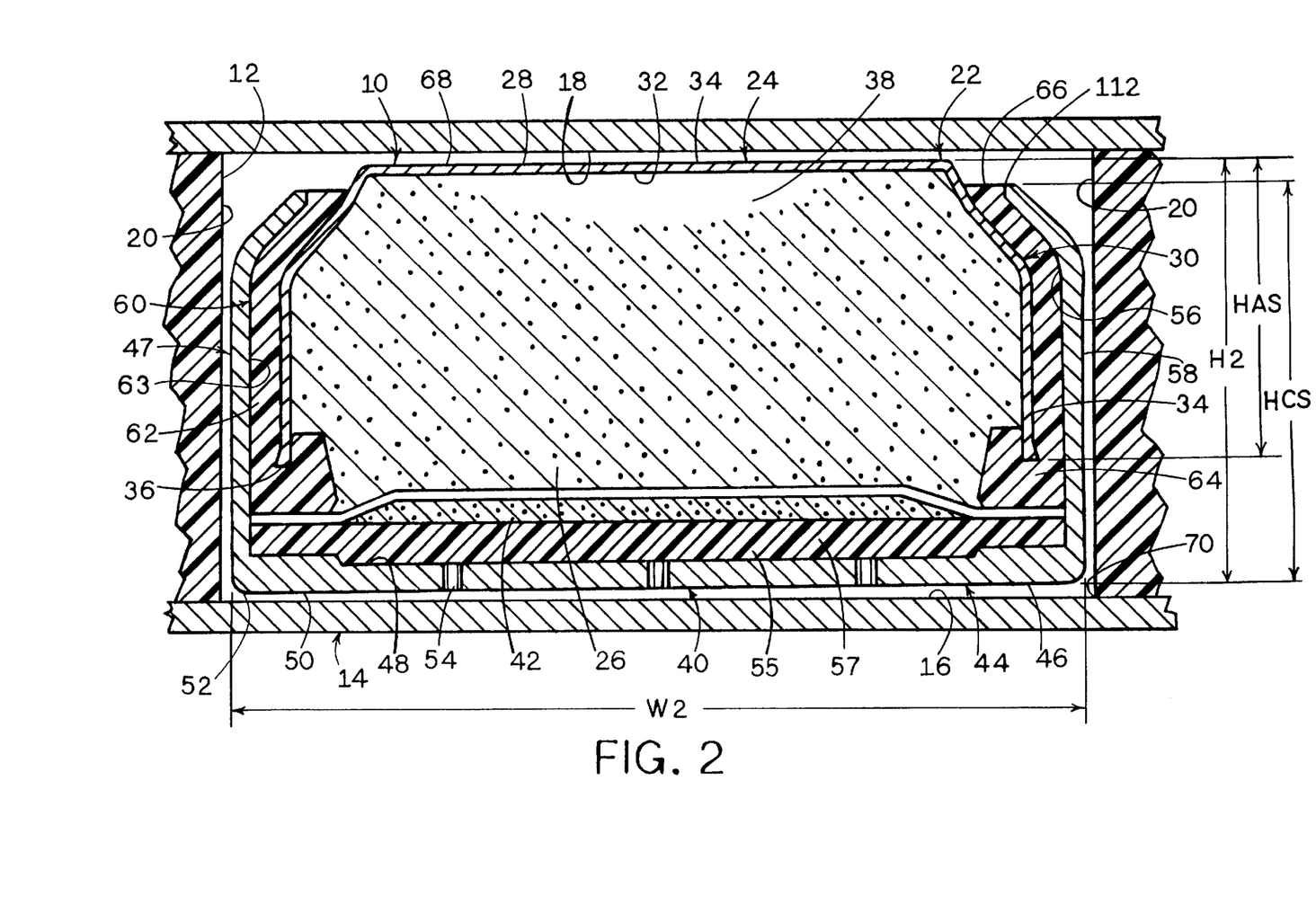
FIG. 2 shows a cross-section of a metal-air electrochemical cell of the invention in a corresponding appliance as in FIG. 1, also inside the space allocated for the cell.

Referring now by characters of reference to the drawings, a comparison of FIGS. 1 and 2 illustrates the general concept of the invention. Referring first to FIG. 2, the cell 10 is disposed inside the space 12 allocated for occupation by the cell, in an appliance 14. As illustrated in FIG. 2, the space 12 is generally bounded by a bottom wall 16 of the appliance, a top wall 18 of the appliance, and side walls 20 of the appliance.

Referring, now, specifically to the cell 10 illustrated in FIG. 2, negative electrode 22, also referred to as anode 22, includes an anode can 24 and electrochemically reactive anode material 26 contained therein. The anode can 24 has a top wall 28, and circumferential downwardly-depending side wall 30. Top wall 28 and side wall 30 have, in combination, an inner surface 32 and an outer surface 34. Side wall 30 has a height "HAS," shown in FIG. 2, generally corresponding to the overall height of the anode can, and terminates in a distal edge at circumferential can foot 36. Top wall 28 and side wall 30 generally define a cavity 38 within the anode can, which cavity 38 contains the anode material 26.

The positive electrode 40, also referred to as cathode 40, includes an air cathode assembly 42, contained within cathode can 44. Cathode can 44 has a bottom 46, and a circumferential upstanding side wall 47. Bottom 46 has a generally flat inner surface 48, a generally flat outer surface 50, and an outer perimeter 52 defined on the flat outer surface 50. A plurality of air ports 54 extend through the bottom 46 of the cathode can, providing avenues for transport of oxygen into the cell adjacent cathode assembly 42. An air reservoir 55 spaces cathode assembly 42 from bottom 46 and the corresponding ports 54. A porous diffusion layer 57 fills air reservoir 55. Circumferential side wall 47 of the cathode can extends upwardly from bottom wall 46, terminates at distal edge 112, and has an inner surface 56 and an outer surface 58.

Side wall 47 has a height "HCS," shown in FIG. 2, generally corresponding to the height of the cathode can. As seen in FIG. 2, height "HAS" of anode can side wall 30 is significantly greater than half the height "HCS" of the cathode can side wall.

Anode 22 is electrically insulated from cathode 40 by seal material illustrated by a seal 60. Seal 60 includes a circumferential side wall 62 disposed in space 63 which side wall extends over a substantial portion of height "HAS" between upstanding side wall 47 of the cathode can and downwardly-depending side wall 30 of the anode can, a seal foot 64 disposed generally between foot 36 of the anode can and cathode assembly 42, and a seal top 66 where side wall 62 of seal 60 extends from between side walls 30 and 47 adjacent the top of the cell. As illustrated in FIG. 2, the anode, including anode can 24 and anode material 26, is received inside the cathode can such that the entirety of the cathode can side wall 47 is disposed radially outwardly of anode can side wall 30.

Outer surface 68 of cell 10 is thus defined by portions of the outer surface 34 of the top of the anode can, outer surface 58 of side wall 47 of the cathode can, outer surface 50 of the bottom of the cathode can, and top 66 of seal 60. Thus, the anode can and the cathode can, in combination, define a top and a bottom of the cell, height "H2," and maximum diameter "W2" of the cell. As seen in FIG. 2, height "H2" and maximum diameter "W2" define a right cylinder, representing an overall volume of the cell between about 0.06 $cm^3$ and about 0.60 $cm^3$.

In general, this invention addresses the materials and structures which affect the degree of efficiency with which cell 10 fills space 12 with electrochemically reactive material. Accordingly, the invention addresses materials, structures, and methods for improving the efficiency with which cell 10 fills space 12 with electrochemically reactive material. To the extent feasible within other constraints on making and using the cell, the cell should have a flat top and a flat bottom. Side wall 47 should meet bottom 46 at a generally perpendicular angle. The top corner of the cell, adjacent top 66 of seal 62 should be as close as possible to the corresponding upper corner of space 12.

Returning again to the prior art, the cell of FIG. 1 is derived from U.S. Pat. Re. No. 31,143. A comparison of the cell of the prior art shown in FIG. 1 to the cell 10 of the invention illustrated in FIG. 2 suggests the significance of the configuration of the outer walls of the cell to the efficiency with which the cell fills the space 12. First addressing the "clearance" portion of space 12, the values for the maximum diameter "W1" of the prior art cell in FIG. 1 and the height "H1" of the cell are less than the respective values for the width "W2" of the cell of the invention in FIG. 2 and the height "H2" of the cell of the invention. The affect of such difference in the absolute values is that the volume defined between the outer surface of the cathode can of the prior art cell of FIG. 1 and the side walls 20 of the space 12 is greater than the volume defined between the outer surface 58 of the cathode can of the invention and the side walls 20 of the space 12. Accordingly, the cell 10 of the invention, as can be seen visually from the comparison of FIGS. 1 and 2, illustrates better use of the first "clearance" portion of space 12.

Further examination of FIG. 1 illustrates the principle of the fourth portion of space 12, namely the "wasted" portion of the space. As seen there, the bottom wall of the cathode can is convex, whereby the outer bottom corners of the space are not occupied by the cell but are, rather, vacant and "wasted," as suggested by the designation "WA" therein. The areas designated "WA" also illustrate a second indicator of waste in the in-cut corners "IC" between the convex portion of the bottom and the downwardly inclined portion of the cell which is disposed outwardly thereof but inwardly of the upstanding side wall of the cathode can. The cell 10 of the invention, on the other hand, efficiently uses the outer bottom corners 70 of space 12, as illustrated in FIG. 2.

Having thus described conceptually the desire to efficiently fill as much as possible of space 12 with cell 10, methods of so filling the space, and of maximizing the fraction of the volume of the cell which is occupied by electrochemically reactive material, will be discussed following.

The Seal

Seal 60 performs at least two primary functions. First, the seal serves as a physical closure for the cell, to prevent anode material and/or electrolyte from leaking from the cell between outer surface 34 of side wall 30 of the anode can and inner surface 56 of side wall 47 of the cathode can. Thus, the seal must possess adequate liquid sealing properties to prevent such leakage. Generally, such properties are available in a variety of resiliently deformable thermoplastic polymeric materials.

Second, the seal provides electrical insulation against passage of electrical current across space 63, thus preventing all effective direct electrical contact between anode can 24 and cathode can 44. Accordingly, side wall 62 of the seal must circumscribe, and provide electrical insulation properties about, the entirety of the circumference of the cell between outer surface 34 and inner surface 56, generally from the top of side wall 47 to the bottom of side wall 30.

Similarly, foot 64 of the seal must circumscribe, and provide electrical insulation properties about, the entirety of the circumference of the cell between foot 36 of side wall 30, the lower portion of side wall 47, and the outer perimeter portion of cathode assembly 42. The combination of good liquid sealing properties and good electrical insulation properties can typically be achieved by molding known battery-grade nylon polymeric material in the desired configuration.

To meet the electrical insulation requirements, the seal must have good dielectric insulation properties, must have a minimum thickness about side wall 62, and must be free of any pinholes or other imperfections that might permit transmission of electric current between side walls 30 and 47. Thickness for seal side wall 62 of about 0.200 to about 0.250 millimeter is common in conventional electrochemical cells. Thickness as low as 0.160 millimeter is known.

In the invention, seals thinner than 0.160 millimeter, as thin as 0.100 millimeter, made from the same resiliently deformable thermoplastic nylon material as the thicker 0.160 millimeter seals, surprisingly exhibit acceptable properties, both liquid seal properties and electrical insulation properties. Depending on the structure of the cell to which the seal is to be applied, intermediate thicknesses such as e.g. 0.150 millimeter, 0.140 millimeter, 0.127 millimeter, or the like, may be selected for some cells. However, where cell volume efficiency is a driving consideration, preferred thicknesses are less, for example 0.120 millimeter or 0.110 millimeter to as thin as 0.100 millimeter. Thus, the range of thicknesses for seals 60 preferred for use in cells 10 of the invention has a lower end of about 0.100 millimeter and an upper end of about 0.150 millimeter. All thicknesses between the lower and upper ends of the range are operable, and thus are included for use in the cells of the invention. Suitable such nylon seals are available from Suratco Products Company, Poynette, Wis. USA.

The Cathode Assembly

Figure 3:
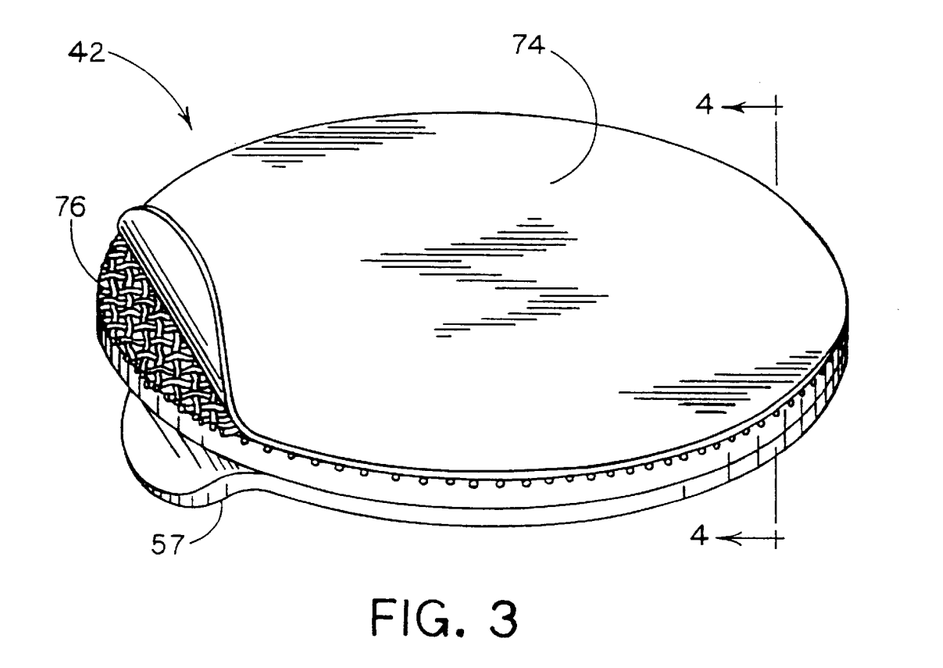
FIG. 3 shows a pictorial view of a cathode assembly used in cells of the invention.
Figure 4:
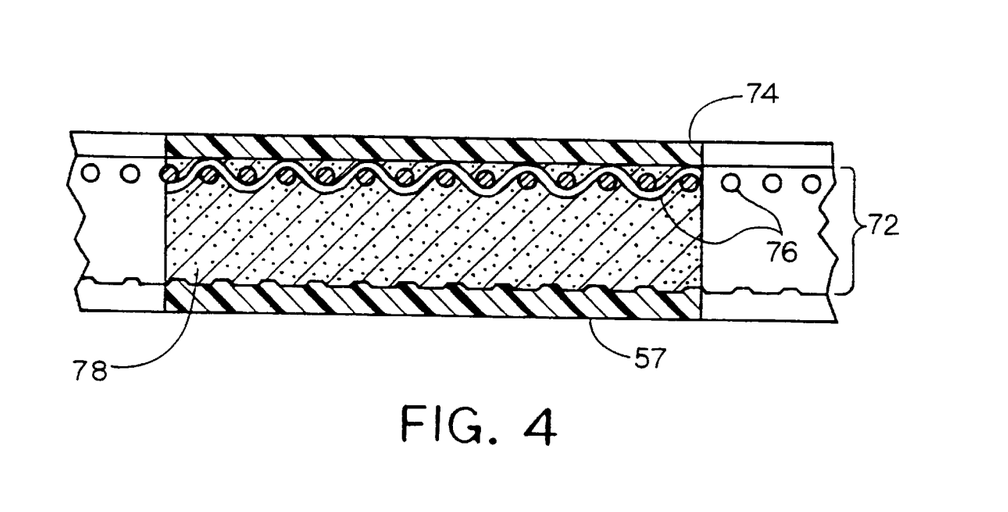
FIG. 4 shows a cross-section of the cathode assembly, taken at 4—4 of FIG. 3.

FIGS. 3 and 4 show respective perspective and cross-section views of the cathode assembly 42 used in cells representative of the present invention. Active layer 72 of the cathode assembly is interposed between barrier layer 74 and air diffusion layer 57. Active layer 72 ranges preferably between about 0.050 millimeter and about 1.25 millimeter thick, and facilitates the reaction between the hydroxyl in the aqueous alkaline electrolyte and the cathodic oxygen of the air. Barrier layer 74 is a micro-porous plastic membrane about 0.025 millimeter thick, typically polypropylene, having the primary function of preventing anodic zinc particles from coming into physical contact with the remaining elements of the cathode assembly 42. Barrier layer 74 however, does permit passage of hydroxyl ions and water therethrough.

Air diffusion layer 57 is preferably a micro-porous hydrophobic polymeric material such as a polytetrafluoroethylene (PTFE) membrane about 0.025 to about 0.050 millimeter thick, which permits passage of air therethrough and which is generally impervious to battery electrolyte, namely potassium hydroxide and other known electrolytes.

Referring to FIG. 4, active layer 72 is further comprised of connecting substratum capable of being connected, as a current collector, to electrical circuitry, namely conductive woven nickel wire layer 76. Carbon, indicated at 78, preferably forms a matrix surrounding the conductive layer 76 of nickel wire. Nickel is preferred for layer 76 because nickel exhibits little or no corrosion in the alkaline environment of the zinc-air cell, and also because nickel is an excellent electrical conductor.

In addressing a primary objective of the invention, the thickness of the cathode assembly between the barrier layer 74 and the diffusion layer 57 should desirably be as small as possible. A cathode assembly preferred for use in electrochemical cells of the invention may be made as follows. Place e.g. 1000 milliliters of distilled water in a non-reactive container, and add 19 grams of $KMnO_4$ thereto. Mix this solution for ten minutes. Then slowly add 204 grams of PWA activated carbon having the appropriate particle sizes to the central mix vortex.

PWA activated carbon has the following characteristics: surface area between about 1000 and 1,150 $m^2/g.$, apparent density of about 0.51 g/cc., real density of about 2.1 g/cc., pore volume of about 0.90 g/cc., specific heat at 100 degrees C. of about 0.25, and about 65% by weight to about 75% by weight of such material will pass through a wet −325 U.S. mesh screen.

After 10 minutes of mixing, slowly and uniformly, and without interruption, add 51 grams of Teflon® T-30 dispersant to the edge of the mix vortex, and continue mixing for yet another ten minutes at the speed required to maintain a vortex in the mix after the Teflon dispersant is added. Filter the resulting solution through Whatman #1 filter paper, and heat to between 100 degrees C. and 140 degrees C., in a mechanical convection drying oven for at least 16 hours, or until dry, to yield a suitable cake of cathode material.

Combine the resulting cathode material with Black Pearls 2000 carbon black and mix for 30 minutes, or until the mix becomes free flowing. Roll the resulting cathode mix between conventional stainless steel roller mills to obtain the active layer 72. Further details for making such preferred cathode assemblies 42 for use in cells 10 of the invention, including methods for incorporating conductive layer 76 of nickel wire into the cathode assembly, are disclosed in U.S. Pat. No. 5,308,711, herein incorporated by reference in its entirety.

The Cathode Can

Figure 5:
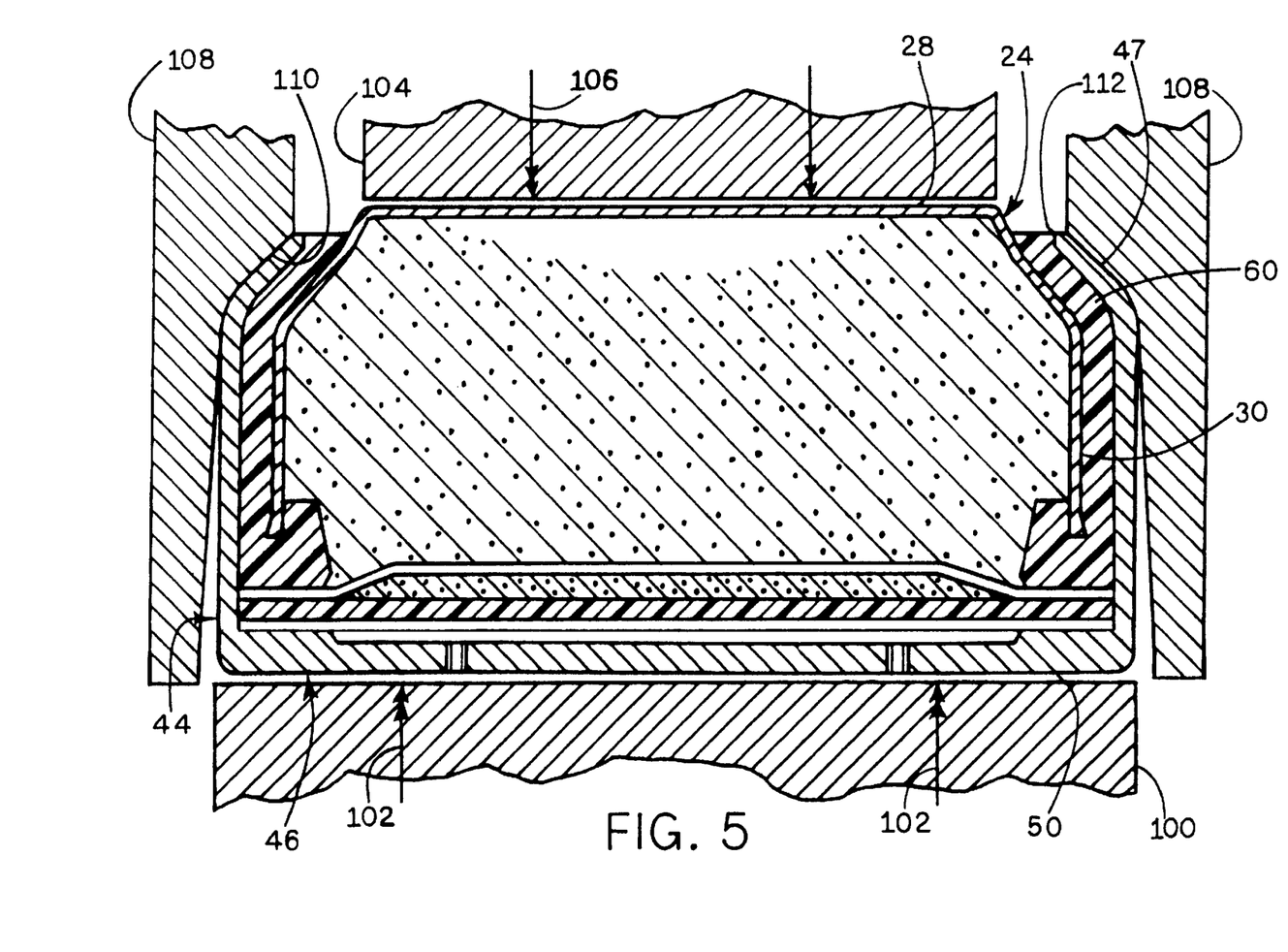
FIG. 5 illustrates the die arrangement, and the final stage of the method used to bring together the anode, the cathode, and the seal, to thereby close and crimp the respective elements in assembly of the cell.
Figure 7:
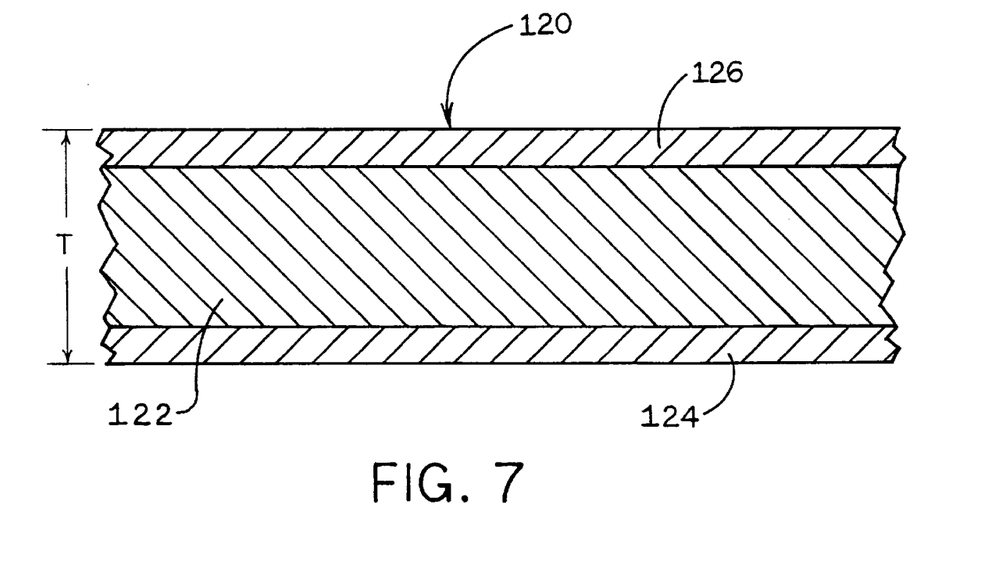
FIG. 7 shows a fragmentary cross-section of metal strip used to make anode cans of the invention.
Figure 8:
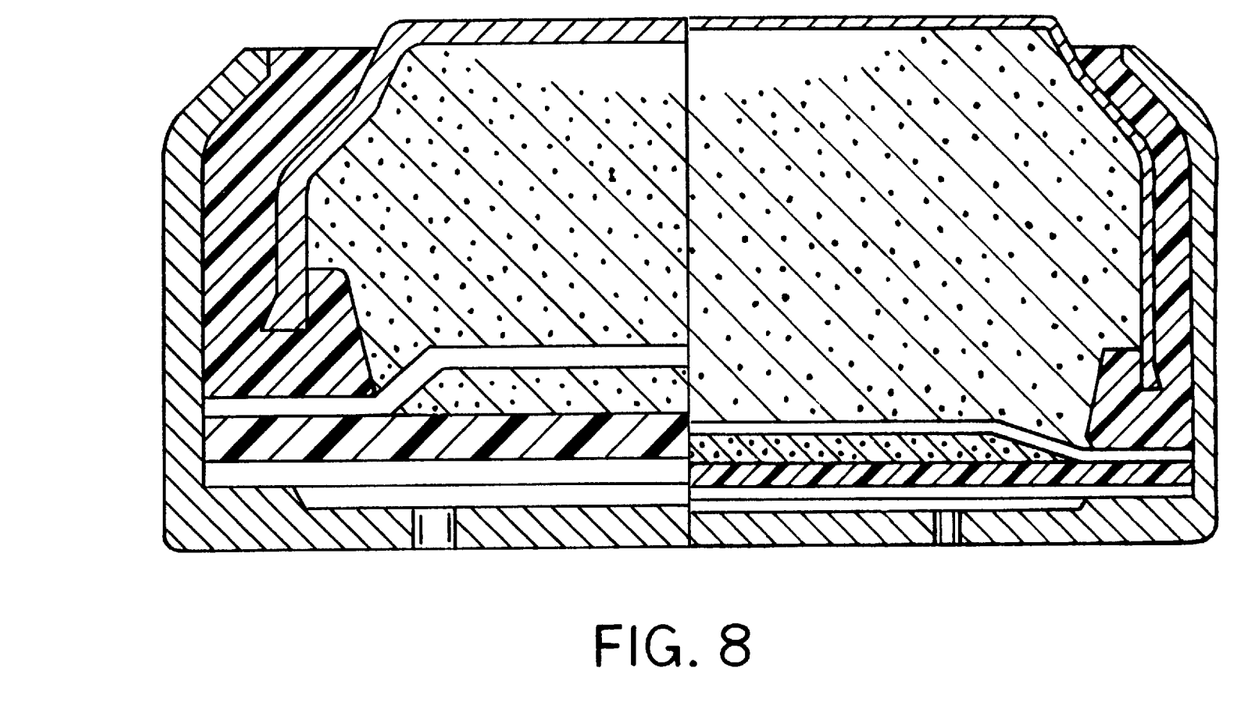
FIG. 8 shows a split-half, side-by-side cross-section comparison of two halves of a metal air cell, illustrating the volume gains achieved using the invention.

FIG. 5 illustrates the die arrangement, and the process of bringing together the anode, the cathode, and the intervening seal, to close the cell and crimp the distal edge 112 of the cathode side wall inwardly against the seal material, and by way of the seal material, against the upper portion of side wall 30. Accordingly, the seal material provides a physical closure. Referring now specifically to FIG. 7, a closing punch 100 exerts an upwardly directed force 102, indicated by the double headed arrows, against the bottom 46 of the cathode can 44. An opposing ejector punch 104 exerts an opposing downwardly directed force 106 of lesser magnitude, indicated by the double headed arrows, against the top wall 28 of the anode can 24. Split closing die 108 generally surrounds the cavity in which the cell is closed and crimped.

As the closing punch 100 exerts the upwardly-directed force 102 indicated by arrows, thus urging the cathode can against the anode can and the seal, the cathode can is moved into the closing die 108 and against the transverse crimping lands 110 of the die. At the same time, the ejector punch 104 exerts its downwardly-directed opposing force 106 against the anode can. In order for the closing punch 100 to crimp the cathode can, thus to force the cathode can closed, it must exert sufficient force to form the inward crimp on the distal edges 112 of the side wall 47, thus gripping anode can 24 and seal 60 in closure of the cell, as well as sufficient force to overcome the resistance of the downwardly-directed opposing force 106 on the anode can.

Force 106 on the anode can has at least two purposes. First, force 106 helps stabilize the anode can while the cell is being closed. Second, force 106 passes, from top wall 28, top-to-bottom through side wall 30 and thence through seal foot 64 against inner surface 48 of bottom 46 of the cathode can, and thus generally opposes any bending moment which may be imposed on bottom 46 of the cathode can, tending to reduce any tendency of bottom 46 to deform as the cell is being closed. Thus, side wall 30 bears force 106 top-to-bottom along height "HAS" as an opposing force to force 102.

The thickness of the cathode can between its inner and outer surfaces, whether at side wall 47 or at bottom 46, can be reduced by making the cathode can from a modified metal strip material. For making conventional button-type cells, it is known to use a three-layer metal strip substrate 114, illustrated in FIG. 6, including a core layer 116 of AISI 1008, Aluminum Killed, Battery Grade cold rolled steel, plated on opposing surfaces with layers 118 of nickel, each of the layers 118 being about 0.00165 mm to about 0.00215 mm thick. The plated three-layer structure 114 is diffusion annealed such that the nickel layers 118 are diffusion bonded to the core layer 116. The diffusion annealed three-layer strip 114 is then temper rolled to specified thickness. However, conventionally-known such three layer structures have limited ability to withstand the closing forces 102, 106 as the thickness of the three-layer metal strip 114 is reduced. In the invention, the thickness of the metal strip 114 can be further reduced where the physical properties of metal strip 114 are modified. Table 1 sets forth comparable properties for a metal strip of the invention, as Invention Example #1, and Comparative Example #1 for a prior art metal strip.

Figure 6:
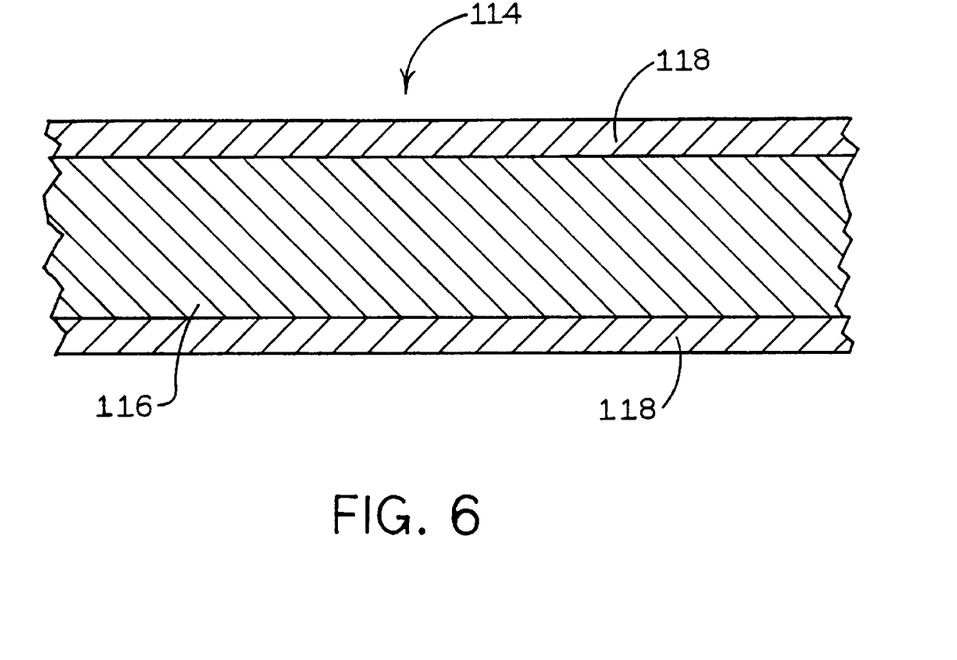
FIG. 6 shows a fragmentary cross-section of metal strip used to make cathode cans of the invention.

As referred to in TABLE 1, and elsewhere herein, the nomenclature used for the Temper of the metal strip 114 is adapted from the Special Temper designation suggested by supplier, Thomas Steel Strip Corporation, Warren, Ohio, from whom metal strip 114 used in the invention can be obtained. Such metal strip can also be obtained from Hille & Muller, Dusseldorf, Germany. Accordingly, the Temper designations "Temper 4" for the Comparative Prior Art Strip, and "Temper 3.5" for the metal strip 114 used in cathode cans used in the invention, represent the combination of physical properties illustrated in TABLE 1. In the temper designation system incorporated into TABLE 1, a lower Temper number generally represents a harder, less ductile material, while a higher Temper number generally represents a softer, more ductile material.

TABLE 1

| Property | Inv. Ex #1 | C Ex 1 |
| --- | --- | --- |
| Temper Number | 3.5 | 4 |
| Grain Size, ASTM E112-88 | 7–12 | 9–12 |
| Yield Strength | 45–52 ksi | 32–45 ksi |
| Elongation, Min, 80–100 mm width | 25% | 35% |
| Hardness | 76–82 | 77–82 |
| Erichsen Ductility ASTM E643-84 | ≧7.5 mm | ≧9.5 mm |

As seen from the properties illustrated in TABLE 1, metal strip 114 used for cathode cans used in cells of the invention has a higher yield strength, less elongation, and is less ductile than conventional metal strips of e.g. Comparative Example 1. Grain size is also reduced to a degree.

The physical properties in TABLE 1 suggest that metal strip 114 is harder and less formable than conventional battery grade metal strip. Yet, battery-forming experiments show that the modified metal strip 114 is suitable for making batteries using the methods disclosed herein.

The hardness and formability of the strip represent compromises between the need to be able to form the strip in making the cathode can 44, and to crimp the distal edges of the side wall 47 in closing the cell at final assembly, and the desire to obtain as much strength as possible in a minimum thickness. While reducing the thickness of strip 114, and while also potentially somewhat reducing the formability of strip 114 as represented by reduced elongation and ductility values, the ability to form the strip is surprisingly preserved, and the strength of the cathode cans formed from the strip is surprisingly preserved at a sufficiently high level that the cans tolerate normal conditions of cell assembly and usage.

Accordingly, metal strip, tempered as above, and suitable for forming cathode cans of the invention for use in metal-air cells, may be preferably about 0.075 mm to about 0.155 mm thick, more preferably about 0.075 mm to about 0.150 mm thick, still more preferably about 0.075 mm to about 0.140 mm thick, most preferably about 0.075 mm to about 0.127 mm thick. Preferred thickness of the metal strip used to form the cathode can is from about 0.090 mm up to less than about 0.110 millimeter. Most preferred thickness is from about 0.100 mm up to less than about 0.110 mm.

Cathode cans suitable to the invention can be formed of virtually any core metal layer that is covered, on its opposing surfaces, with the appropriate metal, e.g. coating, plating or cladding, such appropriate covering having a hydrogen overvoltage similar to that of the corresponding electrode and being insoluble at high pH's (or in the presence of electrolyte), the metal plating or cladding being in chemical communication via the electrolyte with the electrode material, if not in direct physical contact therewith.

Optionally, the can may be formed entirely of a metal or alloy having a hydrogen overvoltage similar to that of the electrode (as opposed to plating or cladding the can) so long as sufficient strength and ductility are available from the material selected. In addition to nickel, other exemplary suitable plating, cladding, or can materials are stainless steel, palladium, silver, platinum, and gold. Steel strip plated with nickel and nickel alloy is generally used because the cost is low, and because pre-plated steel strip, which generally requires no post-plating processes, is commercially available. The metal in the can must be ductile enough to withstand the drawing process, and strong enough to withstand the cell crimping and closure process.

Cathode cans, for example, may be made of cold-rolled steel plated with nickel. Steel strip pre-plated with nickel can also be used. Cathode cans may also be formed from cold-rolled mild steel, with at least the inside portions of the cans being subsequently post plated with nickel. Other examples of materials for cathode cans include nickel-clad stainless steel; nickel-plated stainless steel; INCONEL (INCO alloy of nickel, a non-magnetic alloy); pure nickel with minor alloying elements (NICKEL 200 and related family of NICKEL 200 alloys such as NICKEL 201, etc.), all available from Huntington Alloys, a division of INCO, Huntington, W.V. Some noble metals may also find use as plating, cladding, or can metals, including steel strip plated with nickel, and mild steel strip subsequently plated with nickel after forming the can.

In order to obtain the advantages of the Temper 3.5 metal strip, one, of course, must select appropriate materials and utilize proper metal processing steps, as illustrated above, to obtain the balance of properties of hardness and ductility which provide sufficient strength for the thinner can wall while tolerating the forming steps wherein the can is formed from the metal strip, and wherein the cathode can is crimped about seal 60 and the anode can. Given the above teaching of Temper and related properties, those skilled in the art can now apply the principles taught therein to a variety of related metals and structures.

The Anode Can

A typical anode can of the invention is plated with copper on its inner surface. Copper has an hydrogen overvoltage similar to that of zinc. The anode can is readily formed of stainless steel wherein the inner surface 32 is plated, clad, or otherwise covered with copper, and the outer surface 34 is plated, clad, or otherwise covered with nickel. As illustrated in FIG. 7, typical anode cans comprise a metal strip 120 having a three-layer structure including a core layer 122 of e.g. 304 stainless steel, clad or plated on opposing surfaces with surface layers 124 and 126 of copper and nickel, respectively.

As with other aspects of this invention, the thickness of the metal strip 120 used to form the anode can is desirably reduced to a value less than thicknesses for conventionally known such elements.

In conventional metal strip material used to make anode cans, about 76 percent by volume of the metal is contained in the core layer 122 of stainless steel, about 16 percent by volume is contained in the inner copper layer 124, and about 8 percent by volume is contained in the outer nickel layer 126. Accordingly, with all expressions being percent by volume represented by the respective layers, the conventional structure can be expressed, layer for layer, as /16% Cu/76% SS/8% Ni/.

The strength of the above metal strip structure is generally provided by a combination of (a) thickness of the structure, and (b) the combined strengths of the materials in the individual layers. Regarding materials, the stainless steel provides proportionately more strength than the copper or the nickel. In the invention, the thickness of metal strip 120 can be reduced while maintaining suitable strength and formability in the metal structure.

In the invention, the thickness "T" of metal strip 120 is between about 0.075 millimeter and about 0.145 millimeter, preferably between about 0.075 millimeter and about 0.127 millimeter, more preferably between about 0.090 millimeter and about 0.110 millimeter, and most preferably from about 0.100 millimeter to less than about 0.110 millimeter. To the extent thinner strip 120 can be used, additional space is available in anode 22 for receiving anode material 26, whereby the use life of the cell is respectively improved. Thus, thicknesses at the lower end of the above-recited range are preferred, especially those less than about 0.110 millimeter.

Such reduction in thickness is accomplished in combination with increasing the fraction of the metal which is represented by the stainless steel layer 122. Such increase in the stainless steel fraction provides greater strength per unit of thickness of strip 120.

Increasing the stainless steel fraction correspondingly reduces the fraction of strip 120 represented by layers 124, 126, and also the absolute thicknesses of layers 124, 126. Surprisingly, operational integrity of these already very thin layers 124, 126 is maintained in spite of the additional thinning. Thus, a three-layer structure of the above nature, having the above combination of suitable forming properties along with sufficient strength, stiffness, and crush resistance in the anode can, can be made into anode cans when the relative amounts of the layers 122, 124, and 126 are revised to increase the relative amount of the stainless steel layer 122.

The following structures illustrate that the fractional amount of stainless steel can be increased by up to about 20% over the conventional structures, from 76% stainless steel to about 91% stainless steel. "Cu" is copper. "SS" is stainless steel. "Ni" is nickel. All expressions are percent by volume. Exemplary such structures are:

/16% Cu/82% SS/2% Ni/
/ 7% Cu/91% SS/2% Ni/

The above two structures of metal strip 120, for making anode cans of the invention, are merely illustrative of the full range of structures that can be made wherein the common feature is the increase in the amount of stainless steel relative to the amount of copper and/or nickel and corresponding decrease in relative amounts of copper and/or nickel. Preferably, the thicknesses of layers 124, 126 both decrease in proportion to the increase in thickness of layer 122.

Accordingly, the thickness of the copper layer can range from about 7% to about 16% of the volume of the three-layer metal strip, and the volume of the nickel layer can range from about 2% to about 7% by volume of the three-layer metal strip. So long as the stainless steel content is increased above the conventionally known level of about 76%, the strength of the metal strip 120, for any given thickness, is improved. Thus, the metal strip 120 of the invention allows for reduction in overall thickness of metal strip 120 while maintaining the strength of the anode can, and the operational integrity of layers 124, 126 to conduct electric current associated with operation of an electrochemical cell made with such anode can.

Preferred steps in the development of structures having increasing amounts of the stainless steel layer, and thus higher strength/thickness ratio, produce anode cans having progressively, all in percent by volume/thickness, 77% stainless steel, 80% stainless steel, 83% stainless steel, 87% stainless steel, and 91% stainless steel, with corresponding 20%, 17%, 13%, and 9% as the corresponding combined amounts of the copper and nickel layers 124 and 126. Preferred steps in development of structures for metal strip 120 having decreasing amounts of the copper layer 124 are, all in percent by volume/thickness, 15% copper, 11% copper, and 7% copper. Preferred steps in development of structures having decreasing amounts of the nickel layer 126 are, all in percent by volume/thickness, 7% nickel, 6% nickel, 3% nickel, and 2% nickel. The full range of the structures specified can be obtained from Sumitomo Metals Company, Japan. The most preferred such structure has the designation "high strength CSTN-12," an annealed and work-hardened product.

Those skilled in the art will now see that certain modifications can be made to the cells and their elements, and methods for making and using them, herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A metal-air electrochemical button cell, comprising:
   (a) an anode, including an anode can and anode material in said anode can, said anode can having a top wall, and a first circumferential side wall extending downwardly from said top wall to a first distal edge thereof, said first side wall having a first height generally corresponding to an overall second height of said anode can, said anode can having a first outer surface disposed outwardly on said top wall and outwardly on said first side wall, and thus outwardly on said electrochemical button cell, a second inner surface disposed inwardly on said top wall and inwardly on said first side wall, and thus inwardly on said electrochemical button cell, and an overall thickness between the first outer and the second inner surfaces of about 0.110 millimeter to about 0.145 millimeter, said anode can comprising a first layer comprising nickel, a second layer comprising copper, and a third layer comprising stainless steel between said first and second layers, said third layer comprising about 83 percent by volume to about 91 percent by volume of the overall thickness of at least one of said top wall and said first side wall of said anode can, the combination of said first and second layers comprising about 9 percent by volume to about 17 percent by volume of the overall thickness of the respective one of said top wall and said first side wall;
   (b) a cathode, including a cathode can, said cathode can having a bottom wall and a second circumferential side wall extending upwardly from said bottom wall and terminating at a second distal edge thereof, said second side wall having a third height generally corresponding to an overall fourth height of said cathode can, said cathode can comprising a substrate, said substrate, as taken at a location away from the second distal edge, comprising fourth and fifth layers comprising nickel, and a sixth layer comprising cold rolled steel between said fourth and fifth layers, said cathode further comprising an air cathode assembly in said cathode can, said anode, including said anode can and said anode material, being received inside said cathode can such that the entirety of said second side wall is disposed radially outwardly of said first side wall;
   (c) an aqueous alkaline electrolyte;
   (d) a space between said first and second side walls, extending over a substantial portion of the first height; and
   (e) seal material in the space between said first and second side walls, the combination of the second inner surface of said anode can and said cathode assembly at least in part defining a cavity in said electrochemical button cell, the second height of said first anode can side wall being significantly greater than one half the fourth height of said second side wall of said cathode can, said second side wall of said cathode can being crimped inwardly against said seal material, and by way of said seal material against an upper portion of said first side wall of said anode can such that said seal material provides a physical closure of said electrochemical button cell against leakage of contents out of said electrochemical button cell, and provides electrical insulation against passage of electrical current across the space.

2. A metal-air electrochemical button cell as in claim 1, said cathode can having a third outer surface disposed outwardly on said bottom wall and outwardly on said second side wall, and thus outwardly on said electrochemical button cell, a fourth inner surface disposed inwardly on said bottom wall and inwardly on said second side wall, and thus inwardly on said electrochemical cell, and a thickness between the third outer surface and the fourth inner surface, at one of said bottom wall and said second side wall, of about 0.100 millimeter to about 0.127 millimeter.

3. A metal-air electrochemical button cell as in claim 1, said anode can and said cathode can, in combination, defining a top and a bottom of said metal-air electrochemical button cell, a fifth height between the top and the bottom, and a maximum diameter of said metal-air electrochemical button cell defined by said second side wall, the fifth height and the maximum diameter, in combination, defining a right cylinder, representing an overall volume of said metal-air electrochemical button cell, of between about 0.06 cm$^3$ and about 0.60 cm$^3$.

4. A metal-air electrochemical button cell as in claim 1, the overall thickness of said first side wall between the first outer surface and the second inner surface being defined by a metal strip extending downwardly from said top wall and terminating at a second distal edge of the metal strip coincident with the first distal edge of said first side wall.

5. A metal-air electrochemical button cell as in claim 4, the ratio of the overall fifth height to the maximum diameter being about 0.44/1 to about 0.68/1.

6. A metal-air electrochemical button cell as in claim 4, said first side wall being arranged and configured in said button cell such that, when a closing force is applied to thereby crimp said second side wall of said cathode can inwardly against said seal material at cell closing, said first side wall bears a force along a top-to-bottom height thereof opposing the closing force.

7. A metal-air electrochemical button cell as in claim 1, the ratio of the overall fifth height to the maximum diameter being about 0.44/1 to about 0.68/1.

8. A metal-air electrochemical button cell as in claim 1, said first side wall being arranged and configured in said button cell such that, when a closing force is applied to thereby crimp said second side wall of said cathode can inwardly against said seal material at cell closing, said first side wall bears a force along a top-to-bottom height thereof opposing the closing force.

9. A metal-air electrochemical button cell, comprising:
   (a) an anode, including an anode can and anode material in said anode can, said anode can having a top wall, and a first circumferential side wall extending downwardly from said top wall, said first side wall having a first height generally corresponding to an overall second height of said anode can, said anode can having a first outer surface disposed outwardly on said top wall and said first side wall, and thus outwardly on said electrochemical button cell, and a second inner surface disposed inwardly on said top wall and inwardly on said first side wall, and thus inwardly on said electrochemical button cell;
   (b) a cathode, including a cathode can, said cathode can having a bottom wall and a second circumferential side wall extending upwardly from said bottom wall and terminating at a distal edge thereof, said second side wall having a third height generally corresponding to an overall fourth height of said cathode can, said cathode can comprising a substrate, said substrate, as taken at a location away from said distal edge, comprising first and second layers comprising nickel, and a third layer comprising cold rolled steel between said first and second layers, said cathode further comprising an air cathode assembly in said cathode can, said cathode can having a third outer surface disposed outwardly on said bottom wall and outwardly on said second side wall, and thus outwardly on said electrochemical button cell, a fourth inner surface disposed inwardly on said bottom wall and inwardly on said second side wall, and thus inwardly on said electrochemical cell, and a thickness between the third outer surface and the fourth inner surface, at one of said bottom wall and said second side wall, of about 0.100 millimeter to about 0.140 millimeter, said anode, including said anode can and said anode material being received inside said cathode can such that said second side wall is disposed radially outwardly of said first side wall;
   (c) an aqueous alkaline electrolyte;
   (d) a space between said first and second side walls, extending over a substantial portion of the first height; and
   (e) seal material in the space between said first and second side walls, the second height of said anode can side wall being significantly greater than one half the fourth height of said second side wall of said cathode can, said second side wall of said cathode can being crimped inwardly against said seal material, and by way of said seal material against an upper portion of said anode can.

10. A metal-air electrochemical button cell as in claim 9, said cathode can having a thickness between the third outer and the fourth inner surfaces, at one of said bottom wall and said second side wall, of about 0.100 millimeter to about 0.127 millimeter.

11. A metal-air electrochemical button cell as in claim 9, said anode can having a thickness between the first outer and second inner surfaces of about 0.100 millimeter to about 0.127 millimeter.

12. A metal-air electrochemical button cell as in claim 9, said anode can and said cathode can, in combination, defining a top and a bottom of said metal-air electrochemical button cell, a fifth height between the top and the bottom, and a maximum diameter of said metal-air electrochemical button cell defined by said second side wall, the fifth height and the maximum diameter, in combination, defining a right cylinder, representing an overall volume of said metal-air electrochemical button cell, of between about 0.06 cm$^3$ and about 0.60 cm$^3$.

13. A metal-air electrochemical button cell as in claim 9, said anode can and said cathode can, in combination, defining a top and a bottom of said metal-air electrochemical button cell, a fifth height between the top and the bottom, and a maximum diameter of said metal-air electrochemical button cell defined by said second side wall, the fifth height and the maximum diameter, in combination, defining a right cylinder, representing an overall volume of said metal-air electrochemical button cell, of about 0.20 cm$^3$ to about 0.30 cm$^3$, the ratio of the volume of the cavity in said anode can to the overall volume of said electrochemical button cell being at least 0.53/1.

14. A metal-air electrochemical button cell as in claim 9, the overall thickness of said first side wall between the first outer surface and the second inner surface being defined by a metal strip extending downwardly from said top wall and terminating at a second distal edge of the metal strip coincident with the first distal edge of said first side wall.

15. A metal-air electrochemical button cell as in claim 14, the ratio of the overall fifth height to the maximum diameter being about 0.44/1 to about 0.68/1.

16. A metal-air electrochemical button cell as in claim 14, said first side wall being arranged and configured in said button cell such that, when a closing force is applied to thereby crimp said second side wall of said cathode can inwardly against said seal material at cell closing, said first side wall bears a force along a top-to-bottom height thereof opposing the closing force.

17. A metal-air electrochemical button cell as in claim 9, the ratio of the overall fifth height to the maximum diameter being about 0.44/1 to about 0.68/1.

18. A metal-air electrochemical button cell as in claim 9, said first side wall being arranged and configured in said button cell such that, when a closing force is applied to thereby crimp said second side wall of said cathode can inwardly against said seal material at cell closing, said first side wall bears a force along a top-to-bottom height thereof opposing the closing force.

* * * * *

UNITED STATES PATENT AND TRADEMARK OFFICE
CERTIFICATE OF CORRECTION

PATENT NO. : 5,804,327

DATED : September 8, 1998

INVENTOR(S) : John Edward Oltman

It is certified that error appears in the above-identified patent and that said Letters Patent is hereby corrected as shown below:

In the Specification:

Column 7, line 18, change "width" to --maximum diameter--.
Column 7, line 19, change "affect" to --effect--.

Signed and Sealed this

Eleventh Day of April, 2000

Attest:

Q. TODD DICKINSON

Attesting Officer

Director of Patents and Trademarks